United States Patent
Hsi et al.

(10) Patent No.: US 8,513,912 B2
(45) Date of Patent: Aug. 20, 2013

(54) POWER SUPPLY CIRCUIT

(75) Inventors: Mao-Shun Hsi, New Taipei (TW);
Yau-Shi Hwang, New Taipei (TW);
Chih-Hao Chang, New Taipei (TW);
Chung-Chih Chou, New Taipei (TW);
Po-Nien Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 353 days.

(21) Appl. No.: 13/086,239

(22) Filed: Apr. 13, 2011

(65) Prior Publication Data

US 2012/0062309 A1     Mar. 15, 2012

(30) Foreign Application Priority Data

Sep. 13, 2010   (CN) .......................... 2010 1 0279654

(51) Int. Cl.
*H01M 6/50*    (2006.01)
*H02J 7/00*    (2006.01)

(52) U.S. Cl.
USPC .......................................... 320/100; 320/127

(58) Field of Classification Search
USPC ......................................................... 320/100
See application file for complete search history.

(56) References Cited

U.S. PATENT DOCUMENTS

| | | | | |
|---|---|---|---|---|
| 5,811,976 | A * | 9/1998 | Fischer | 324/434 |
| 6,268,710 | B1 * | 7/2001 | Koga | 320/116 |
| 6,850,035 | B2 * | 2/2005 | Hashimoto | 320/104 |
| 7,026,790 | B2 * | 4/2006 | Kim et al. | 320/112 |
| 8,144,024 | B2 * | 3/2012 | Akimov et al. | 340/636.1 |
| 2007/0145947 | A1 * | 6/2007 | Sakurai et al. | 320/132 |
| 2011/0309802 | A1 * | 12/2011 | Hoffman et al. | 320/163 |

* cited by examiner

*Primary Examiner* — Arun Williams
(74) *Attorney, Agent, or Firm* — Altis Law Group, Inc.

(57) ABSTRACT

A power supply circuit for protecting a battery from current leakage when the battery is not in use includes a control signal input circuit and a switch circuit. The control signal input circuit receives a first control signal from a chip and output a second control signal. The switch circuit receives the second control signal and turns on or off an electronic connection between the battery and the chip. Wherein when the battery is not in use and not being charged by the adaptor, there is a possibility of current leakage from the battery. In such case, the switch circuit turns off the electronic connection between the battery and the chip, and the battery does not provide power to the chip.

14 Claims, 2 Drawing Sheets

POWER SUPPLY CIRCUIT

BACKGROUND

1. Technical Field

The disclosure relates to power supply circuit, especially to a power supply circuit for protecting a battery from current leakage when the battery not in use.

2. Description of Related Art

A button cell is a small single cell battery shaped as a squat cylinder typically 5 to 12 mm in diameter and 1 to 6 mm high—like a button on a garment, hence the name. Button cells are commonly used to power small portable electronics devices such as wrist watches, pocket calculators, and hearing aids. Button cells also are used as a backup power for personal computer real time clocks and BIOS configuration data. A typical backup power supply circuit does not have a current leakage protection function, which leads to power loss.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
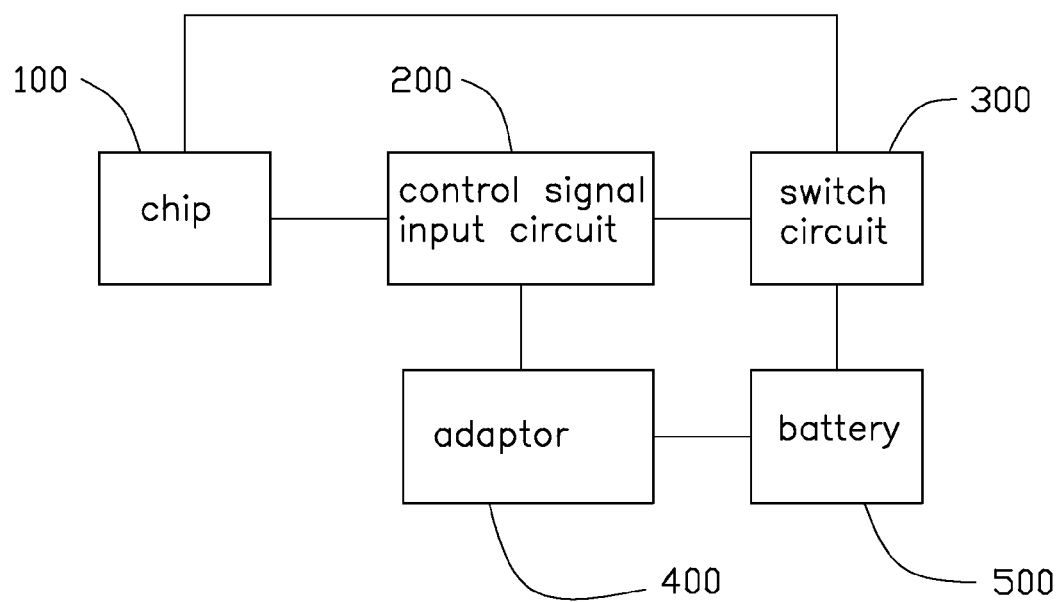
FIG. 1 is a block diagram of an embodiment of a power supply circuit.
Figure 2:
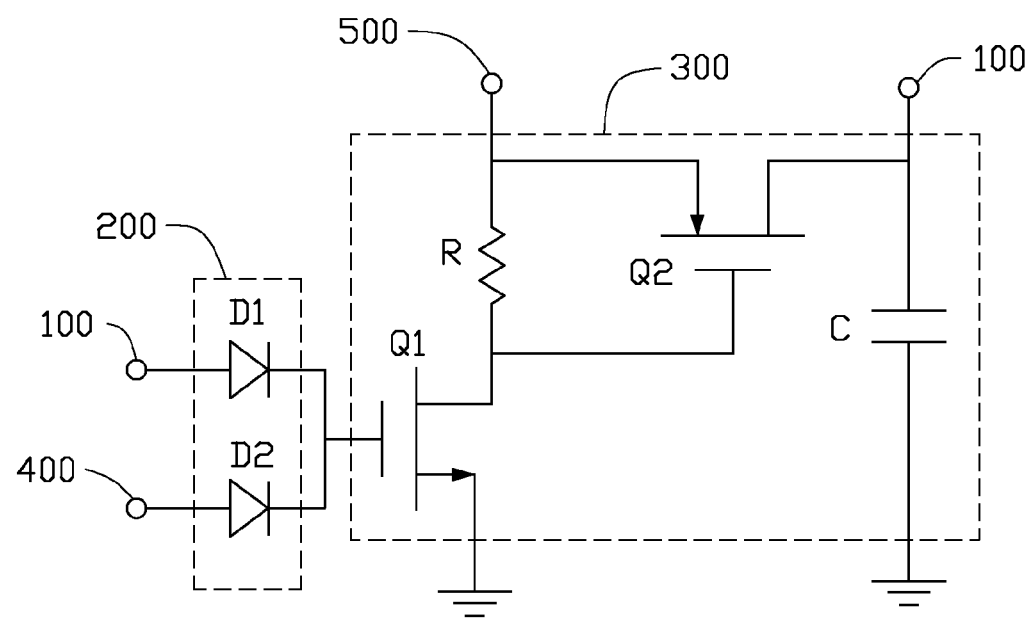
FIG. 2 is a circuit view of FIG. 1.

Referring to FIG. 1, an embodiment of a power supply circuit for protecting a battery 500 from current leakage when the battery 500 is not in use. The power supply circuit includes a chip 100, a control signal input circuit 200, a switch circuit 300 and an adaptor 400. The chip 100 outputs a first control signal. The adaptor 400 outputs a third control signal. The control signal input circuit 200 receives the first and third control signals, and outputs a second control signal. The switch circuit 300 receives the second control signal, and turns on or off an electronic connection between the battery 500 and the chip 100. The adaptor 400 charges the battery 500 when the battery 500 is discharged Referring to FIG. 2, the control signal input circuit 200 includes a first diode D1 and a second diode D2. An anode of the first diode D1 is electrically connected to the chip 100 to receive the first control signal. An anode of the second diode D2 is electrically connected to the adaptor 400 to receive the third control signal. Cathodes of the first diode D1 and the second diode D2 are electrically connected together to output the second control signal.

The switch circuit 300 includes a first switch Q1, a second switch Q2, a resistor R and a capacitor C. Each of the first switch Q1 and the second switch Q2 includes a first terminal, a second terminal and a third terminal. When the first terminal of the first switch Q1 receives the second control signal, the second terminal of the first switch Q1 is grounded. The third terminal of the first switch Q1 is electrically connected to the first terminal of the second switch Q2. The third terminal of the first switch Q1 is electrically connected to the battery 500 via the resistor R. The second terminal of the second switch Q2 is electrically connected to the battery 500. The third terminal of the second switch Q2 is electrically connected to the chip 100. The third terminal of the second switch Q2 is grounded via the capacitor C.

In one embodiment, the first switch Q1 is an N-channel MOSFET; and the second switch Q2 is an P-channel MOSFET. The first terminal is a gate; the second terminal is a source; and the third terminal is a drain.

When the battery 500 is in use and there is no current leakage from the battery 500, the anode of the first diode D1 receives a high level voltage first control signal. The control signal input circuit 200 outputs a high level voltage second control signal to the gate of the first switch Q1. The first switch Q1 turns on. The gate of the second switch Q2 receives a low level voltage from ground. The second switch Q2 turns on. Ultimately, the battery 500 is electrically connected and provides power to the chip 100.

When the battery 500 is in use and being charged by the adaptor 400, the anode of the second diode D2 receives a high level voltage third control signal. The control signal input circuit 200 outputs the high level voltage second control signal to the gate of the first switch Q1. The first switch Q1 turns on. The gate of the second switch Q2 receives the low level voltage from ground. The second switch Q2 turns on. Ultimately, the battery 500 is electrically connected and provides power to the chip 100.

When the battery 500 is not in use and not being charged by the adaptor 400, and if there is current leakage from the battery 500; the anode of the first diode D1 receives a low level voltage first control signal, and the anode of the second diode D2 receives a low level voltage third control signal. The control signal input circuit 200 outputs a low level voltage second control signal to the gate of the first switch Q1. The first switch Q1 turns off. The gate of the second switch Q2 receives a high level voltage from the battery 500. The second switch Q2 turns off. Consequently, the battery 500 is not electrically connected to the chip 100 and does not provide power to the chip 100.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit comprising:
a control signal input circuit configured to receive a first control signal, from a chip, and a third control signal, from an adaptor, and output a second control signal; and
a switch circuit configured to receive the second control signal and turn on or off an electronic connection between the battery and the chip; wherein, when the battery is not in use and not being charged by the adaptor and if there is current leakage from the battery, the control signal input circuit receives a low level voltage first control signal, from the chip, and a low level voltage third control signal, from the adaptor, and outputs a low level voltage second control signal, the switch circuit is configured to turn off the electronic connection between the battery and the chip such that the battery does not provide power to the chip.

2. The power supply circuit of claim 1, wherein the control signal input circuit comprises a first diode and a second diode; an anode of the first diode is configured to receive the first control signal from the chip; an anode of the second diode is configured to receive the third control signal from the adaptor; and cathodes of the first diode and the second diode are electrically connected together for outputting the second control signal.

3. The power supply circuit of claim 2, wherein the switch circuit comprises a first switch, a second switch, a resistor and a capacitor; each of the first switch and the second switch comprises a first terminal, a second terminal and a third terminal; the first terminal of the first switch is configured to receive the second control signal; the second terminal of the first switch is grounded; the third terminal of the first switch is electrically connected to the first terminal of the second switch; the third terminal of the first switch is electrically connected to the battery via the resistor; the second terminal of the second switch is electrically connected to the battery; the third terminal of the second switch is electrically connected to the chip; and the third terminal of the second switch is grounded via the capacitor.

4. The power supply circuit of claim 3, wherein the first switch is an N-channel MOSFET; the second switch is an P-channel MOSFET; the first terminal is a gate; the second terminal is a source; and the third terminal is a drain.

5. The power supply circuit of claim 4, wherein when the battery is in use and there is no current leakage from the battery, the anode of the first diode is configured to receive a high level voltage first control signal, the switch circuit is configured to turn on the electronic connection between the battery and the chip, and the battery is configured to provide power to the chip.

6. The power supply circuit of claim 4, wherein when the battery is in use and being charged by the adaptor, the anode of the second diode is configured to receive a high level voltage third control signal, the switch circuit is configured to turn on the electronic connection between the battery and the chip, and the battery is configured to provide power to the chip.

7. A power supply circuit comprising:
a control signal input circuit configured to receive a first control signal, from a chip, and output a second control signal; and
a switch circuit configured to receive the second control signal and turn on or off an electronic connection between the battery and the chip; wherein, when the battery is not in use and not being charged by an adaptor and if there is current leakage from the battery, the switch circuit is configured to turn off the electronic connection between the battery and the chip; and the battery does not provide power to the chip.

8. The power supply circuit of claim 7, wherein the control signal input circuit comprises a first diode; an anode of the first diode is configured to receive the first control signal from the chip; and a cathode of the first diode is configured to output the second control signal.

9. The power supply circuit of claim 8, wherein the control signal input circuit further comprises a second diode; an anode of the second diode is configured to receive it will a third control signal from the adaptor; and the cathode of the first diode and a cathode of the second diode are electrically connected together for outputting the second control signal.

10. The power supply circuit of claim 9, wherein the switch circuit comprises a first switch, a second switch, a resistor and a capacitor; each of the first switch and the second switch comprises a first terminal, a second terminal and a third terminal; the first terminal of the first switch is configured to receive the second control signal; the second terminal of the first switch is grounded; the third terminal of the first switch is electrically connected to the first terminal of the second switch; the third terminal of the first switch is electrically connected to the battery via the resistor; the second terminal of the second switch is electrically connected to the battery; the third terminal of the second switch is electrically connected to the chip; and the third terminal of the second switch is grounded via the capacitor.

11. The power supply circuit of claim 10, wherein the first switch is an N-channel MOSFET; the second switch is an P-channel MOSFET; the first terminal is a gate; the second terminal is a source; and the third terminal is a drain.

12. The power supply circuit of claim 11, wherein when the battery is in use and there is no current leakage from the battery, the anode of the first diode is configured to receive a high level voltage first control signal, the switch circuit is configured to turn on the electronic connection between the battery and the chip; and the battery is configured to provide power to the chip.

13. The power supply circuit of claim 11, wherein when the battery is in use and being charged by the adaptor, the anode of the second diode is configured to receive a high level voltage third control signal, the switch circuit is configured to turn on the electronic connection between the battery and the chip; and the battery is configured to provide power to the chip.

14. The power supply circuit of claim 11, wherein when the battery is not in use and not being charged by the adaptor and if there is current leakage from the battery, the anode of the first diode is configured to receive a low level voltage first control signal; and the anode of the second diode is configured to receive a low level voltage third control signal.

* * * * *